(12) United States Patent
Moosaei et al.

(10) Patent No.: US 11,941,681 B2
(45) Date of Patent: Mar. 26, 2024

(54) SYSTEM, METHOD, AND COMPUTER PROGRAM PRODUCT FOR DETERMINING COMPATIBILITY BETWEEN ITEMS IN IMAGES

(71) Applicant: Visa International Service Association, San Francisco, CA (US)

(72) Inventors: Maryam Moosaei, San Jose, CA (US); Hao Yang, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 507 days.

(21) Appl. No.: 17/271,257

(22) PCT Filed: Aug. 26, 2019

(86) PCT No.: PCT/US2019/048102
§ 371 (c)(1),
(2) Date: Feb. 25, 2021

(87) PCT Pub. No.: WO2020/046795
PCT Pub. Date: Mar. 5, 2020

(65) Prior Publication Data
US 2021/0256588 A1 Aug. 19, 2021

Related U.S. Application Data

(60) Provisional application No. 62/725,454, filed on Aug. 31, 2018.

(51) Int. Cl.
*G06K 9/00* (2022.01)
*G06N 3/084* (2023.01)
(Continued)

(52) U.S. Cl.
CPC ......... *G06Q 30/0631* (2013.01); *G06N 3/084* (2013.01); *G06T 7/0002* (2013.01);
(Continued)

(58) Field of Classification Search
None
See application file for complete search history.

(56) References Cited

U.S. PATENT DOCUMENTS 8,103,551 B2 1/2012 Saul et al.
8,249,941 B2 8/2012 Saul et al.
(Continued)

FOREIGN PATENT DOCUMENTS

WO 2017142361 A1 8/2017

OTHER PUBLICATIONS

Blei et al., "Correlated Topic Models", Advances in Neural Information Processing Systems (NIPS), 2006, 8 pages, retrieved from https://proceedings.neurips.cc/paper/2005/file/9e82757e9a1c12cb710ad680db11f6f1-Paper.pdf.
(Continued)

*Primary Examiner* — Soo Jin Park
(74) *Attorney, Agent, or Firm* — The Webb Law Firm

(57) ABSTRACT

Systems, methods, and computer program products for determining compatibility between items in images obtain image data associated with a plurality of images, each image being associated with a single item of a plurality of items, each image including a plurality of elements of a matrix, and the plurality of elements of the matrix of each image including the image data associated with that image; for each image, input the image data associated with that image as a single object in a set of objects to a relation network; and generate a compatibility score for the plurality of items from the relation network based on the set of objects, the compatibility score including a prediction of whether the plurality of items is compatible.

18 Claims, 5 Drawing Sheets

(51) Int. Cl.
   G06Q 30/0601 (2023.01)
   G06T 7/00 (2017.01)
(52) U.S. Cl.
   CPC ............... *G06T 2207/20081* (2013.01); *G06T 2207/20084* (2013.01)

(56) References Cited

U.S. PATENT DOCUMENTS

| | | | |
|---|---|---|---|
| 9,015,093 | B1 | 4/2015 | Commons |
| 9,070,171 | B2 | 6/2015 | Guo et al. |
| 9,147,207 | B2 | 9/2015 | Haaramo et al. |
| 9,367,763 | B1 | 6/2016 | Soldevila et al. |
| 9,727,620 | B2 | 8/2017 | Kang |
| 2012/0308121 | A1 | 12/2012 | Datta et al. |
| 2014/0019498 | A1 | 1/2014 | Cidon et al. |
| 2014/0310304 | A1 | 10/2014 | Bhardwaj et al. |
| 2016/0379352 | A1 | 12/2016 | Zhang et al. |
| 2018/0012110 | A1 | 1/2018 | Souche et al. |
| 2018/0046882 | A1 | 2/2018 | Carroll et al. |

OTHER PUBLICATIONS

Chao et al., "A Framework for Robust Feature Selection for Real-time Fashion Style Recommendation", IMCE '09, 2009, pp. 35-41.
Deng et al., "ImageNet: A Large-Scale Hierarchical Image Database", IEEE Conference on CVPR, 2009, 8 pages, retrieved from https://image-net.org/static_files/papers/imagenet_cvpr09.pdf.
Hadsell et al., "Dimensionality Reduction by Learning an Invariant Mapping", IEEE Conference on CVPR, 2006, 8 pages.
Han et al., "Learning Fashion Compatibility with Bidirectional LSTMs", ACM on Multimedia Conference, 2017, 9 pages, arXiv:1707.05691v1.
He et al., "Fashionista: A Fashion-aware Graphical System for Exploring Visually Similar Items", International Conference on WorldWide Web, 2016, 4 pages, arXiv: 1604.00071v1.
Hochreiter et al., "Long Short-Term Memory", Neural Computation, 1997, pp. 1735-1780, vol. 9(8).
Hsiao et al., "Creating Capsule Wardrobes from Fashion Images", 2018, 15 pages, arXiv:1712.02662v2.
Huang et al., "Densely Connected Convolutional Networks", IEEE Conference on CVPR, 2017, pp. 4700-4708.
Iwata et al., "Fashion Coordinates Recommender System Using Photographs from Fashion Magazines", Proceedings of the Twenty-Second International Joint Conference on Artificial Intelligence, 2011, pp. 2262-2267.
Jing et al., "Visual Search at Pinterest", ACM SIGKDD International Conference on Knowledge Discovery and Data Mining, 2015, 10 pages, arXiv:1505.07647v3 (Mar. 2017).
Kang et al., "Visually-Aware Fashion Recommendation and Design with Generative Image Models", IEEE International Conference on Data Mining (ICDM), 2017, 10 pages, arXiv:1711.02231v1.
Kiapour et al., "Where to Buy It: Matching Street Clothing Photos in Online Shops", IEEE Conference on CVPR, 2015, pp. 3343-3351.
Lee et al., "Style2Vec: Representation Learning for Fashion Items from Style Sets", 2017, arXiv: 1708.04014v1.
Li et al., "Mining Fashion Outfit Composition Using an End-to-End Deep Learning Approach on Set Data", IEEE Transactions on Multimedia, 2017, 10 pages, arXiv:1608.03016v2.
Lin et al., "Explainable Outfit Recommendation with Joint Outfit Matching and Comment Generation", 2019 arXiv:1806.08977v3, 16 pages.
Ngiam et al., "Multimodal Deep Learning", Proceedings of the 28th International Conference on Machine Learning, 2011, 8 pages.
Qian et al., "Personalized Recommendation Combining User Interest and Social Circle", IEEE Transactions on Knowledge and Data Engineering, Jul. 2014, pp. 1763-1777, vol. 26, No. 7.
Raposo et al., "Discovering Objects and Their Relations from Entangled Scene Representations", 2017, 16 pages, arXiv:1702.05068v1.
Rendle et al., "BPR: Bayesian Personalized Ranking from Implicit Feedback", UAI, 2009, pp. 452-461.
Santoro et al., "A simple neural network module for relational reasoning", 2017, 10 pages, arXIV:1706.01427v1.
Song et al., "NeuroStylist: Neural Compatibility Modeling for Clothing Matching", ACM on Multimedia Conference, 2017, pp. 763-761.
Song et al., "Neural Compatibility Modeling with Attentive Knowledge Distillation", the 41st International ACM SIGIR Conference on Research & Development in Information Retrieval, 2018, 10 pages, arXiv:1805.00313v1.
Tautkute et al., "DeepStyle: Multimodal Search Engine for Fashion and Interior Design", IEEE Access, 2019, pp. 84613-84628, vol. 7.
Vaccaro et al., "The Elements of Fashion Style", 29th Annual Symposium on User Interface Software and Technology (UIST), 2016, pp. 777-785.
Vasileva et al., "Learning Type-Aware Embeddings for Fashion Compatibility", 2018, 66 pages, arXiv:1803.09196v2.
Veit et al., "Learning Visual Clothing Style with Heterogeneous Dyadic Co-occurences", IEEE International Conference on Computer Vision, 2015, pp. 4642-4650.
Wang et al., "Utilizing Related Products for Post-Purchase Recommendation in E-commerce", RecSys'11, 2011, 4 pages.

SYSTEM, METHOD, AND COMPUTER PROGRAM PRODUCT FOR DETERMINING COMPATIBILITY BETWEEN ITEMS IN IMAGES

CROSS REFERENCE TO RELATED APPLICATION

This application is the United States national phase of International Application No. PCT/US2019/048102 filed Aug. 26, 2019, and claims the benefit of U.S. Provisional Patent Application No. 62/725,454, filed Aug. 31, 2018, the disclosures of which are hereby incorporated by reference in their entirety.

BACKGROUND

1. Technical Field

This disclosure relates to systems, methods, and computer program products for determining compatibility between items in images.

2. Technical Considerations

The e-commerce market has attracted attention in the artificial intelligence, computer vision, multimedia, and recommendation systems communities. For example, the e-commerce fashion industry is expected to rise world-wide from $481 billion in market revenue in 2018 to $712 billion in market revenue by 2022, which shows the increasing demand for online apparel shopping and motivates businesses to build more advanced recommendation systems.

Fashion recommendation systems have typically relied on co-purchased and co-clicked histories and recommended items based on similarity and user reviews. However, with recent advances in artificial intelligence and computer vision, recommendation systems have begun to use content-based approaches that incorporate visual information, because fashion is an inherently visual domain. For example, many consumers may not buy a fashion item without first seeing an image of the fashion item. Accordingly, some fashion recommendation systems may recommend similar items to an image query. Similarity based fashion recommendation systems may be useful for finding substitutes for an item (e.g., finding a substitute shirt with the same style but different brand or price as a shirt, etc.) or matching street images to online products. However, users may often be interested in searching for a different category of items which are compatible and/or in harmony with an item. For example, consumers may be interested in purchasing items that match and compose a stylish outfit. However, making such recommendations may require going beyond retrieving similar items to developing an understanding of the notion of compatibility.

Modeling compatibility may be challenging because semantics that determine what is compatible and/or stylish may be complex and/or many factors, such as color, cut, pattern, texture, style, culture, personal taste, and/or the like, may contribute to what an individual perceives as compatible and fashionable. Accordingly, there is a need in the art for improving determination of compatibility between items in images, such as between fashion items in images of fashion outfits, and/or the like.

SUMMARY

Accordingly, provided are improved systems, devices, products, apparatus, and/or methods for determining compatibility between items in images.

According to some non-limiting embodiments or aspects, provided is a computer-implemented method for determining compatibility between items in images, including: obtaining, with at least one processor, image data associated with a plurality of images, wherein each image is associated with a single item of a plurality of items, wherein each image includes a plurality of elements of a matrix, and wherein the plurality of elements of the matrix of each image includes the image data associated with that image; for each image, inputting, with at least one processor, the image data associated with that image as a single object in a set of objects to a relation network; and generating, with at least one processor, a compatibility score for the plurality of items from the relation network based on the set of objects, wherein the compatibility score includes a prediction of whether the plurality of items is compatible.

In some non-limiting embodiments or aspects, the method further includes: for each image, processing, with at least one processor, the image data associated with that image with at least one convolutional neural network to produce a feature vector of the image; and for each image, inputting, with at least one processor, the feature vector of that image as the single object in the set of objects to the relation network.

In some non-limiting embodiments or aspects, generating the compatibility score for the plurality of items from the relation network based on the set of objects further includes: for each pair of objects in the set of objects, processing, with at least one processor, that pair of objects with at least one multi-layer perceptron to produce a relation output; determining, with at least one processor, an average of the relation outputs of the each pair of objects in the set of objects to produce a single averaged output; and processing, with at least one processor, the single averaged output with at least one other multi-layer perceptron to produce the compatibility score for the plurality of items.

In some non-limiting embodiments or aspects, for each pair of objects in the set of objects, processing of that pair of objects with the at least one multi-layer perceptron is order invariant.

In some non-limiting embodiments or aspects, for each pair of objects in the set of objects, processing of that pair of objects with the at least one multi-layer perceptron is independent of question embedding.

In some non-limiting embodiments or aspects, the method further includes: obtaining, with at least one processor, text data associated with one or more images of the plurality of images, wherein, for each of the one or more images associated with the text data, the text data includes a textual description of the single item associated with that image; for each of the one or more images associated with the text data, concatenating, with at least one processor, the image data associated with that image with the text data associated with that image to produce concatenated data for that image; and for each of the one or more images associated with the text data, inputting, with at least one processor, the concatenated data for that image as the single object in the set of objects to the relation network.

In some non-limiting embodiments or aspects, the method further includes: for each image, processing, with at least one processor, the image data associated with that image with at least one convolutional neural network to produce a feature vector of the image; and for each of the one or more images associated with the text data, processing, with at least one processor, the text data associated with that image with at least one multi-layer perceptron to produce an embedding of the textual description of the single item associated with that image, wherein the concatenated data for each of the one or more images associated with the text data includes the feature vector of that image and the embedding of the text description of the single item associated with that image.

In some non-limiting embodiments or aspects, the method further includes: adjusting, with at least one processor, a weighting of the at least one convolutional neural network, a weighting of the at least one multi-layer perceptron, and a weighting of the relation network based on back propagation using a loss function applied to the compatibility score for the plurality of items.

In some non-limiting embodiments or aspects, the plurality of images includes two or more images, the plurality of items includes two or more items, and each image of the two more images is associated with a different single item of the plurality of items.

In some non-limiting embodiments or aspects, the plurality of images includes at least three images, the plurality of items includes at least three items, and each image of the at least three images is associated with a different single item of the plurality of items.

In some non-limiting embodiments or aspects, the plurality of items includes at least one of the following: at least one clothing item, at least one furniture item, at least one landscaping item, at least one graphical user interface item, at least one architectural item, at least one artwork item, or any combination thereof.

According to some non-limiting embodiments or aspects, provided is a system for determining compatibility between items in images, including: at least one processor programmed and/or configured to: obtain image data associated with a plurality of images, wherein each image is associated with a single item of a plurality of items, wherein each image includes a plurality of elements of a matrix, and wherein the plurality of elements of the matrix of each image includes the image data associated with that image; input, for each image, the image data associated with that image as a single object in a set of objects to a relation network; and generate a compatibility score for the plurality of items from the relation network based on the set of objects, wherein the compatibility score includes a prediction of whether the plurality of items is compatible.

In some non-limiting embodiments or aspects, the at least one processor is further programmed and/or configured to: process, for each image, the image data associated with that image with at least one convolutional neural network to produce a feature vector of the image; and input, for each image, the feature vector of that image as the single object in the set of objects to the relation network.

In some non-limiting embodiments or aspects, the at least one processor is further programmed and/or configured to generate the compatibility score for the plurality of items from the relation network based on the set of objects by: for each pair of objects in the set of objects, processing that pair of objects with at least one multi-layer perceptron to produce a relation output; determining an average of the relation outputs of the each pair of objects in the set of objects to produce a single averaged output; and processing the single averaged output with at least one other multi-layer perceptron to produce the compatibility score for the plurality of items.

In some non-limiting embodiments or aspects, for each pair of objects in the set of objects, processing of that pair of objects with the at least one multi-layer perceptron is order invariant.

In some non-limiting embodiments or aspects, for each pair of objects in the set of objects, processing of that pair of objects with the at least one multi-layer perceptron is independent of question embedding.

In some non-limiting embodiments or aspects, the at least one processor is further programmed or configured to: obtain text data associated with one or more images of the plurality of images, wherein, for each of the one or more images associated with the text data, the text data includes a textual description of the single item associated with that image; concatenate, for each of the one or more images associated with the text data, the image data associated with that image with the text data associated with that image to produce concatenated data for that image; and input, for each of the one or more images associated with the text data, the concatenated data for that image as the single object in the set of objects to the relation network.

In some non-limiting embodiments or aspects, the at least one processor is further programmed or configured to: process, for each image, the image data associated with that image with at least one convolutional neural network to produce a feature vector of the image; and process, for each of the one or more images associated with the text data, the text data associated with that image with at least one multi-layer perceptron to produce an embedding of the textual description of the single item associated with that image, wherein the concatenated data for each of the one or more images associated with the text data includes the feature vector of that image and the embedding of the text description of the single item associated with that image.

In some non-limiting embodiments or aspects, the at least one processor is further programmed or configured to: adjust a weighting of the at least one convolutional neural network, a weighting of the at least one multi-layer perceptron, and a weighting of the relation network based on back propagation using a loss function applied to the compatibility score for the plurality of items.

In some non-limiting embodiments or aspects, the plurality of images includes at least three images, the plurality of items includes at least three items, and each image of the at least three images is associated with a different single item of the plurality of items.

In some non-limiting embodiments or aspects, the plurality of items includes at least one of the following: at least one clothing item, at least one furniture item, at least one landscaping item, at least one graphical user interface item, at least one architectural item, at least one artwork item, or any combination thereof.

According to some non-limiting embodiments or aspects, provided is a computer program product including at least one non-transitory computer-readable medium including one or more instructions that, when executed by at least one processor, cause the at least one processor to: obtain image data associated with a plurality of images, wherein each image is associated with a single item of a plurality of items, wherein each image includes a plurality of elements of a matrix, and wherein the plurality of elements of the matrix of each image includes the image data associated with that image; input, for each image, the image data associated with that image as a single object in a set of objects to a relation network; and generate a compatibility score for the plurality of items from the relation network based on the set of objects, wherein the compatibility score includes a prediction of whether the plurality of items is compatible.

Further non-limiting embodiments or aspects are set forth in the following numbered clauses:

Clause 1. A computer-implemented method for determining compatibility between items in images, comprising: obtaining, with at least one processor, image data associated with a plurality of images, wherein each image is associated with a single item of a plurality of items, wherein each image includes a plurality of elements of a matrix, and wherein the plurality of elements of the matrix of each image comprises the image data associated with that image; for each image, inputting, with at least one processor, the image data associated with that image as a single object in a set of objects to a relation network; and generating, with at least one processor, a compatibility score for the plurality of items from the relation network based on the set of objects, wherein the compatibility score includes a prediction of whether the plurality of items is compatible.

Clause 2. The computer-implemented method of clause 1, further comprising: for each image, processing, with at least one processor, the image data associated with that image with at least one convolutional neural network to produce a feature vector of the image; and for each image, inputting, with at least one processor, the feature vector of that image as the single object in the set of objects to the relation network.

Clause 3. The computer-implemented method of clauses 1 or 2, wherein generating the compatibility score for the plurality of items from the relation network based on the set of objects further comprises: for each pair of objects in the set of objects, processing, with at least one processor, that pair of objects with at least one multi-layer perceptron to produce a relation output; determining, with at least one processor, an average of the relation outputs of the each pair of objects in the set of objects to produce a single averaged output; and processing, with at least one processor, the single averaged output with at least one other multi-layer perceptron to produce the compatibility score for the plurality of items.

Clause 4. The computer-implemented method of any of clauses 1-3, wherein, for each pair of objects in the set of objects, processing of that pair of objects with the at least one multi-layer perceptron is order invariant.

Clause 5. The computer-implemented method of any of clauses 1-4, wherein, for each pair of objects in the set of objects, processing of that pair of objects with the at least one multi-layer perceptron is independent of question embedding.

Clause 6. The computer-implemented method of any of clauses 1-5, further comprising: obtaining, with at least one processor, text data associated with one or more images of the plurality of images, wherein, for each of the one or more images associated with the text data, the text data includes a textual description of the single item associated with that image; for each of the one or more images associated with the text data, concatenating, with at least one processor, the image data associated with that image with the text data associated with that image to produce concatenated data for that image; and for each of the one or more images associated with the text data, inputting, with at least one processor, the concatenated data for that image as the single object in the set of objects to the relation network.

Clause 7. The computer-implemented method of any of clauses 1-6, further comprising: for each image, processing, with at least one processor, the image data associated with that image with at least one convolutional neural network to produce a feature vector of the image; and for each of the one or more images associated with the text data, processing, with at least one processor, the text data associated with that image with at least one multi-layer perceptron to produce an embedding of the textual description of the single item associated with that image, wherein the concatenated data for each of the one or more images associated with the text data includes the feature vector of that image and the embedding of the text description of the single item associated with that image.

Clause 8. The computer-implemented method of any of clauses 1-7, further comprising: adjusting, with at least one processor, a weighting of the at least one convolutional neural network, a weighting of the at least one multi-layer perceptron, and a weighting of the relation network based on back propagation using a loss function applied to the compatibility score for the plurality of items.

Clause 9. The computer-implemented method of any of clauses 1-8, wherein the plurality of images includes at least three images, wherein the plurality of items includes at least three items, and wherein each image of the at least three images is associated with a different single item of the plurality of items.

Clause 10. The computer-implemented method of any of clauses 1-9, wherein the plurality of items includes at least one of the following: at least one clothing item, at least one furniture item, at least one landscaping item, at least one graphical user interface item, at least one architectural item, at least one artwork item, or any combination thereof.

Clause 11. A system for determining compatibility between items in images, comprising: at least one processor programmed and/or configured to: obtain image data associated with a plurality of images, wherein each image is associated with a single item of a plurality of items, wherein each image includes a plurality of elements of a matrix, and wherein the plurality of elements of the matrix of each image comprises the image data associated with that image; input, for each image, the image data associated with that image as a single object in a set of objects to a relation network; and generate a compatibility score for the plurality of items from the relation network based on the set of objects, wherein the compatibility score includes a prediction of whether the plurality of items is compatible.

Clause 12. The system of clause 11, wherein the at least one processor is further programmed and/or configured to: process, for each image, the image data associated with that image with at least one convolutional neural network to produce a feature vector of the image; and input, for each image, the feature vector of that image as the single object in the set of objects to the relation network.

Clause 13. The system of clauses 11 or 12, wherein the at least one processor is further programmed and/or configured to generate the compatibility score for the plurality of items from the relation network based on the set of objects by: for each pair of objects in the set of objects, processing that pair of objects with at least one multi-layer perceptron to produce a relation output; determining an average of the relation outputs of the each pair of objects in the set of objects to produce a single averaged output; and processing the single averaged output with at least one other multi-layer perceptron to produce the compatibility score for the plurality of items.

Clause 14. The system of any of clauses 11-13, wherein, for each pair of objects in the set of objects, processing of that pair of objects with the at least one multi-layer perceptron is order invariant.

Clause 15. The system of any of clauses 11-14, wherein, for each pair of objects in the set of objects, processing of that pair of objects with the at least one multi-layer perceptron is independent of question embedding.

Clause 16. The system of any of clauses 11-15, wherein the at least one processor is further programmed or configured to: obtain text data associated with one or more images of the plurality of images, wherein, for each of the one or more images associated with the text data, the text data includes a textual description of the single item associated with that image; concatenate, for each of the one or more images associated with the text data, the image data associated with that image with the text data associated with that image to produce concatenated data for that image; and input, for each of the one or more images associated with the text data, the concatenated data for that image as the single object in the set of objects to the relation network.

Clause 17. The system of any of clauses 11-16, wherein the at least one processor is further programmed or configured to: process, for each image, the image data associated with that image with at least one convolutional neural network to produce a feature vector of the image; process, for each of the one or more images associated with the text data, the text data associated with that image with at least one multi-layer perceptron to produce an embedding of the textual description of the single item associated with that image; and adjust a weighting of the at least one convolutional neural network, a weighting of the at least one multi-layer perceptron, and a weighting of the relation network based on back propagation using a loss function applied to the compatibility score for the plurality of items, wherein the concatenated data for each of the one or more images associated with the text data includes the feature vector of that image and the embedding of the text description of the single item associated with that image.

Clause 18. The system of any of clauses 11-17, wherein the plurality of images includes at least three images, wherein the plurality of items includes at least three items, and wherein each image of the at least three images is associated with a different single item of the plurality of items.

Clause 19. The system of any of clauses 11-18, wherein the plurality of items includes at least one of the following: at least one clothing item, at least one furniture item, at least one landscaping item, at least one graphical user interface item, at least one architectural item, at least one artwork item, or any combination thereof.

Clause 20. A computer program product including at least one non-transitory computer-readable medium including one or more instructions that, when executed by at least one processor, cause the at least one processor to: obtain image data associated with a plurality of images, wherein each image is associated with a single item of a plurality of items, wherein each image includes a plurality of elements of a matrix, and wherein the plurality of elements of the matrix of each image comprises the image data associated with that image; input, for each image, the image data associated with that image as a single object in a set of objects to a relation network; and generate a compatibility score for the plurality of items from the relation network based on the set of objects, wherein the compatibility score includes a prediction of whether the plurality of items is compatible.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

Figure 1:
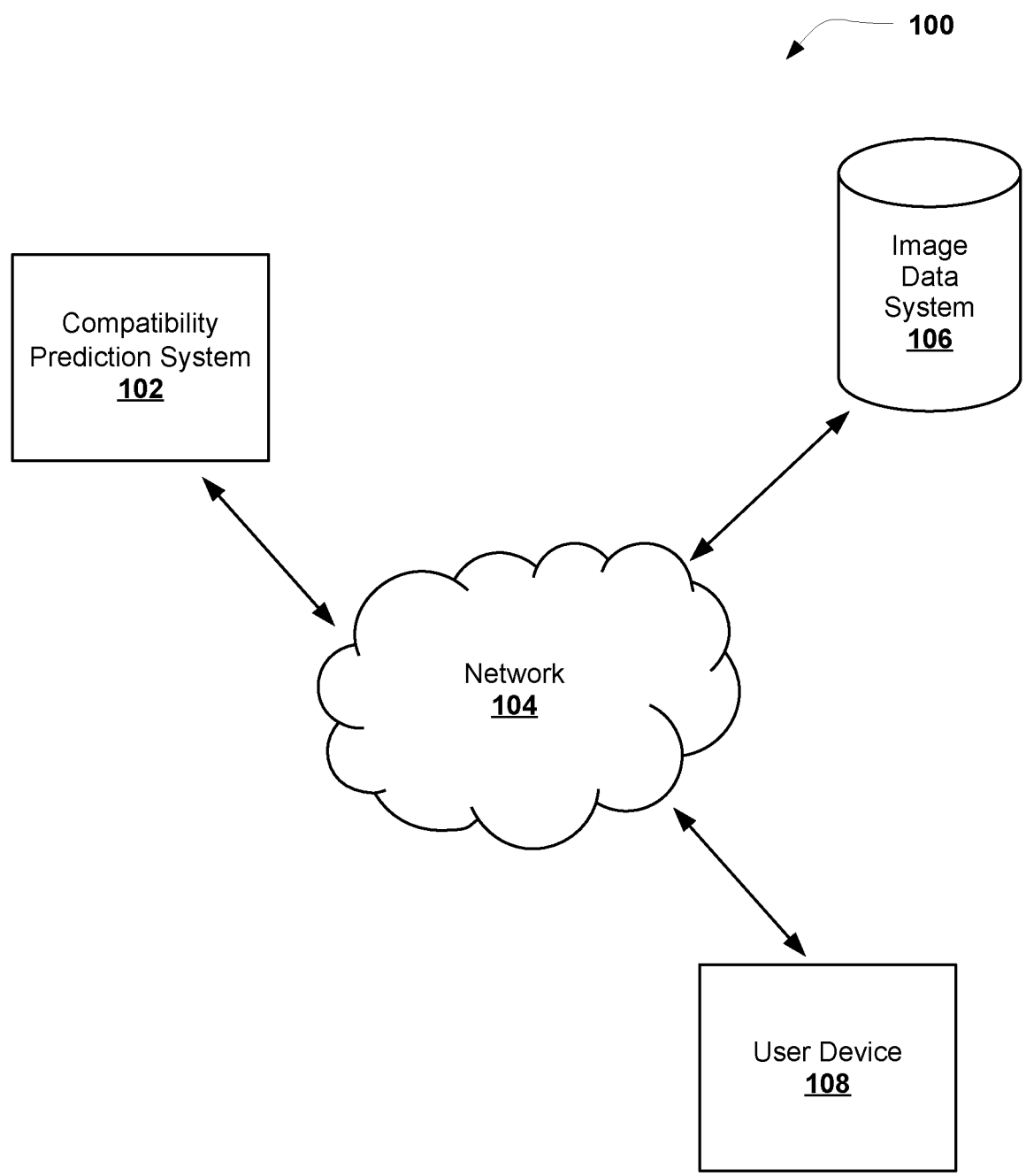
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

An existing recommendation system uses images of co-purchased items to train a Siamese neural network for predicting compatibility between pairs of items. Another existing recommendation system integrates visual and contextual information to improve compatibility prediction. For example, to exploit a pair-wise compatibility between fashion item tops and fashion item bottoms, this existing recommendation system learns a latent compatibility space by employing a dual autoencoder network and a Bayesian Personalized Ranking (BPR) framework.

Another existing recommendation system uses a model that is capable of matching fashion item tops with fashion item bottoms and generating a sentence for each recommendation to explain why the matched items match. For example, this existing recommendation system uses a mutual attention mechanism to model compatibility and a cross-modality attention module to learn a transformation between a visual space and a textual space for generating a sentence as a comment.

Another existing recommendation system answers novel queries, such as finding a set of fashion item tops that can be substituted for a particular fashion item top in an outfit (e.g., high compatibility), while being different from the particular fashion item top (e.g., low similarity), by jointly learning two embedding spaces, one for item similarity and the other for item compatibility.

However, these existing recommendation systems use pair-wise matching and learn compatibility between fashion item tops and fashion item bottoms. These existing recommendation systems fail to consider an entire outfit with an arbitrary number of items.

Another existing recommendation system considered an outfit as a sequence (from top to bottom and then accessories and each item in the outfit as a time step, by training a bi-directional LSTM (BiLSTM) model to sequentially predict the next item conditioned on previous ones, thereby learning compatibility between the items. This existing recommendation system used attribute and category information as a regularization for training its model. However, treating a set of items as a sequence and using a LSTM-based model does not recognize that items in a set of items may be order invariant. These existing recommendation systems thus sort items in each outfit in a consistent order based on the category labels to avoid a compatible fashion item top and bottom being determined as incompatible if the order of the items is changed (e.g., from top-bottom to bottom-top, etc.).

Another existing recommendation system uses an unsupervised compatibility learning framework which uses textual attributes of items by employing a correlated topic model (CTM) from text analysis to learn compatibility. For example, this existing recommendation system considers an outfit as a document, visual attributes (E.g., floral, chiffon, etc.) as words, and style as a topic, and the model learns the composition of attributes that characterizes a style. As an example, a formal blazer may be more likely to be combined with a pair of jeans than a floral legging.

An existing relation network may be used for answering Boolean semantic questions about a scene in an image (e.g., "is a blue cylinder in the image larger than a red cube in the image?", etc.). This existing relation network uses a long short-term memory (LSTM) model to embed textual questions for input to the existing relation network. In addition, this existing relation network may receive as input one image of an entire scene (e.g., a single image including each of multiple items in the scene, etc.). Therefore, what the objects or items in the scene include and/or where the objects or items in the scene are located is ambiguous and, as a result, this existing relation network considers each row of a convolutional neural network (CNN) feature map as an object. For example, this existing relation network receives as input only one feature map of an entire scene including each of the items in the scene. An existing relation network uses P(n,2) pairs of objects, which causes the order of the two objects in each pair of objects to matter (e.g., to influence an output of the existing relation network, etc.). This existing relation network must sum the output of each of the pairs of objects that are passed through a multi-layer perceptron (MLP) "g".

In this way, existing compatibility systems and methods and/or relation networks can only determine a compatibility of a pair of items and cannot consider an entire set of multiple items, are not order invariant with respect to items in the set of multiple items (e.g., use a fixed order or a fixed number of items to determine compatibility, etc.), require category labels (e.g., rich textual descriptions of item types, such as shirt, shoes, and/or the like for clothing items, brands, etc.), and/or cannot achieve sufficient accuracy in compatibility prediction.

Provided are improved systems, devices, products, apparatus, and/or methods for determining compatibility between items in images.

Non-limiting embodiments or aspects of the present disclosure are directed to systems, methods, and computer program products that obtain image data associated with a plurality of images, each image being associated with a single item of a plurality of items, each image including a plurality of elements of a matrix, and the plurality of elements of the matrix of each image including the image data associated with that image; input, for each image, the image data associated with that image as a single object in a set of objects to a relation network; and generate a compatibility score for the plurality of items from the relation network based on the set of objects, the compatibility score including a prediction of whether the plurality of items is compatible. In this way, non-limiting embodiments or aspects of the present disclosure may provide for determining compatibility between items in images using a relation network model that provides several technical advantages over existing relation networks and existing compatibility systems and methods.

Non-limiting embodiments or aspects of the present disclosure may not answer semantic questions to learn compatibility between items in images (e.g., compatibility between a visual appearance of clothing items, etc.). For example, non-limiting embodiments or aspects of the present disclosure may not use a long short-term memory (LSTM) model, which significantly reduces a complexity of a model according to non-limiting embodiments or aspects of the present disclosure.

In non-limiting embodiments or aspects of the present disclosure, an input to a relation network may include multiple images of multiple items (e.g., a separate image for each item, etc.) instead of only one image (e.g., instead of a single image including multiple items, etc.). For example, systems, methods, and computer program products that use a relation network model according to non-limiting embodiments or aspects of the present disclosure may be structured to receive as input two or more images of the items in a set of items (e.g., two or more images of the apparel items in an outfit including multiple apparel items, etc.). In such an example, non-limiting embodiments or aspects of the present disclosure may use convolutional neural network (CNN) layers (e.g., a DenseNet, etc.) to convert each image to a feature vector, each feature vector can be considered an object, and the object can represent an actual item. For example, non-limiting embodiments or aspects of the present disclosure can use multiple CNN maps, and each CNN can correspond to a single object of a set of objects input to a relation network, which enables the relation network to have stronger feature representations. In some non-limiting embodiments or aspects, after passing each pair of objects through at least one multi-layer perceptron (MLP) (e.g., through multiple MLP layers, etc.), the outputs are averaged together to provide one feature vector that represents the entire scene (e.g., that represents each of the multiple items in the multiple images, etc.). In contrast, an existing relation network sums MLP outputs. In some non-limiting embodiments or aspects, a relation network may not use category labels. In this way, non-limiting embodiments or aspects of the present disclosure may not use an LTSM, provide more clear definitions of what objects in a scene include and/or where objects in the scene are located, receive, as input, multiple images (e.g., an image for each item, etc.) without requiring the use of category labels for items, and/or provide a higher accuracy in compatibility prediction.

Non-limiting embodiments or aspects of the present disclosure may provide a network or model that is capable of combining text and image per each item, which enables combining images of items and descriptions of the items in the images to improve performance of the network. As an example, instead of using a pre-trained CNN model, (e.g., a DenseNet, etc.) the network can include trainable layers that extract visual features from items, for example, using multiple CNN layers or a DenseNet that is not pre-trained.

Non-limiting embodiments or aspects of the present disclosure may also provide a separate channel that processes text. For example, a dictionary of each of the words that appear more than a threshold number of times (e.g., more than 15 times, etc.) in an entire dataset of item descriptions (e.g., in one example the size of the dataset may include 7,119 item descriptions, etc.) can be created from text data associated with the images. Each item's description can be converted into a Boolean vector of size 7,119. Each item description can be passed through MLP layers to produce an embedding of the item description. Each item visual feature can be concatenated with its corresponding textual feature, and the concatenated data can be considered as an object. In this way, for pairs of items that are passed to the relation network model, each item's feature vector may represent both visual and textual information. When back propagation is used to update the network's weights, the weights, for both CNN layers that extract visual features, and the weights for the MLP layers that extract textual features can be updated. In this way, the performance of the network is improved because more powerful features (e.g., visual and textual features, etc.) are used and their embeddings are learned (e.g., instead of using a pre-trained DenseNet, etc.).

In this way, a relation network according to some non-limiting embodiments or aspects can differ from an existing relation network for at least the following reasons: I) inputs to a relation network according to non-limiting embodiments or aspects are different than an existing relation network. For example, "$v_i$" and "$v_j$", which are the inputs to "g" in the relation network, can be feature vectors extracted from two images of items i and j in a set of multiple items.

In this way, each of the inputs may represent its own item in the set of multiple items (e.g., each of the inputs can represent a different item from the other inputs, and a relation network according to some non-limiting embodiments or aspects may receive as input an object for each item, etc.). In an existing relation network, "$v_i$" and "$v_j$" are two rows of a single feature map extracted from one image of an entire scene (e.g., a single image including a set of multiple items, etc.), such that the two vectors may represent a part of a background, a texture, or an item in the image or scene. II) An existing relation network uses P(n,2) pairs of objects, which causes the order of the two objects in each pair of objects to matter. A relation network according to non-limiting embodiments or aspects may use C(n,2) pairs of items as objects, which enables the relation network to be order invariant with respect to the order of the two items or objects in each pair (e.g., the order of the two items in each pair does not matter, etc.). III) A relation network according to non-limiting embodiments or aspects can average the output of each of the pairs of feature vectors that are passed through "g" in the relation network. In an existing relation network, the outputs must be summed. IV) In an existing relation network, each pair of objects that goes through "g" in the relation network includes two feature vectors and a third component, which is provided from LSTM, that includes an embedding vector of the textual question that is required to be asked about the scene. For example, the relations are question dependent in an existing relation network. In a relation network according to some non-limiting embodiments or aspects, the relations are not question dependent (e.g., the relations are question independent, etc.) and, therefore, the question embedding may not be used as input to "g" in the relation network. Accordingly, similar to a human approach to compatibility, which need not use textual descriptions of items in a set of items and category labels for the items in order to determine compatibility of the items, non-limiting embodiments or aspects may provide a compatibility learning model that is based on visual information and does not require labeling item attributes or feeding items in a fixed order to the model.

Referring now to FIG. 1, FIG. 1 is a diagram of an example environment 100 in which systems, devices, products, apparatus, and/or methods, described herein, may be implemented. As shown in FIG. 1, environment 100 includes compatibility prediction system 102, network 104, image data system 106, and user device 108. Systems and/or devices of environment 100 may interconnect via wired connections, wireless connections, or a combination of wired and wireless connections. For example, systems and/or devices of environment 100 may interconnect and/or communicate data and/or information (e.g., image data, text data, compatibility scores, etc.) via network 104.

Compatibility prediction system 102 may include one or more devices capable of predicting compatibility between items in images. For example, compatibility prediction system 102 may include one or more devices capable of obtaining image data associated with a plurality of images, each image being associated with a single item of a plurality of items, each image including a plurality of elements of a matrix, and the plurality of elements of the matrix of each image including the image data associated with that image; inputting, for each image, the image data associated with that image as a single object in a set of objects to a relation network; and generating a compatibility score for the plurality of items from the relation network based on the set of objects, the compatibility score including a prediction of whether the plurality of items is compatible. In some non-limiting embodiments or aspects, the plurality of images includes at least three images, the plurality of items includes at least three items, and each image of the at least three images is associated with a different single item of the plurality of items.

In some non-limiting embodiments, an image includes a matrix (e.g., a grid, a rectangular array, a multi-dimensional grid, a multi-dimensional array, a set of rows and columns, etc.) that has a plurality of elements (e.g., units, cells, pixels, etc.). Each element of the matrix includes image data (e.g., a value of image data, a value of geographic location image data, a value of vehicle map data, a value of feature map data, a value of a prediction score of map, etc.) associated with the image. In some non-limiting embodiments, each element of an image is associated with three dimensions. For example, a first dimension of the element is a width of the element, a second dimension of the element is a length of the element, and a third dimension is a value associated with the image data of the element.

Network 104 may include one or more wired and/or wireless networks. For example, network 104 can include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Image data system 106 may include one or more devices capable of storing and/or providing image data associated with images including items, text data associated with items in images, such as category labels (e.g., rich textual descriptions of item types, such as shirt, shoes, and/or the like for clothing items, brands, etc.), and/or the like. For example, image data system 106 may provide or make available one or more websites and/or one or more databases from which images of items are available for retrieval, and compatibility prediction system 102 can web crawl the one or more websites and/or query the one or more databases to retrieve the images to create a dataset of image data. As an example, one or more of the images may be associated with an indication that a set of multiple items in the one or more images is compatible (e.g., a positive sample, etc.) and/or one or more other images may be associated with an indication that a set of multiple items in the one or more other images is not compatible (e.g., a negative sample, etc.). In such an example, image data system 106 may include a fashion website (e.g., Polyvore, Chictopia, Shoplook, etc.) from which images that each include a single clothing item (e.g., a shirt, a skirt, a hat, a purse, etc.) can be retrieved and/or generated, and a fashion outfit including each clothing item may be associated with an indication that the set of multiple clothing items in the fashion outfit is compatible. In some non-limiting embodiments or aspects, an image of an item may be associated with metadata, such as an item description, an item price, an item popularity ranking, a URL link to purchase the item, and/or the like. However, non-limiting embodiments or aspects are not limited thereto, and an item in an image may include any type of item, such as a clothing item, a furniture item (e.g., a chair, a desk, a lamp, etc.), a landscaping item (e.g., a bush, a tree, a flower, etc.), a graphical user interface item (e.g., text, a link, an image, a background, etc.), an architectural item (e.g., a building, a column, a window, etc.), an artwork item (e.g., a painting, a sculpture, etc.), and/or the like.

User device 108 may include a client device and/or the like. For example, user device 108 can be associated with a user. In some non-limiting embodiments or aspects, user device 108 can receive information associated with one or more compatibility scores from compatibility prediction system 102 and/or image data system 106. As an example, compatibility prediction system 102 can receive images of items from and/or associated with the user, and generate, for a user of user device 108, information associated with one or more other items that are compatible with the items received from the user. In such an example, compatibility prediction system 102 may provide a recommendation for the one or more other items that are compatible with the items received from and/or associated with the user, and the recommendation may include images of the one or more other items and/or metadata associated therewith, such as an item description, an item price, an item popularity ranking, a URL link to purchase the item, and/or the like. For example, compatibility prediction system 102 may recommend items based on the predicted compatibility of the items with a query or with known items, such as items in an online shopping cart of the user, and/or the like. As an example, a user may create a set of items using user device 108 and determine a predicted compatibility of the created set of items using user device 108 (e.g., an outfit and a number of candidate items may be given and user device 108 and/or compatibility prediction system 102 may determine an item that best matches with the existing items in the outfit, etc.).

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
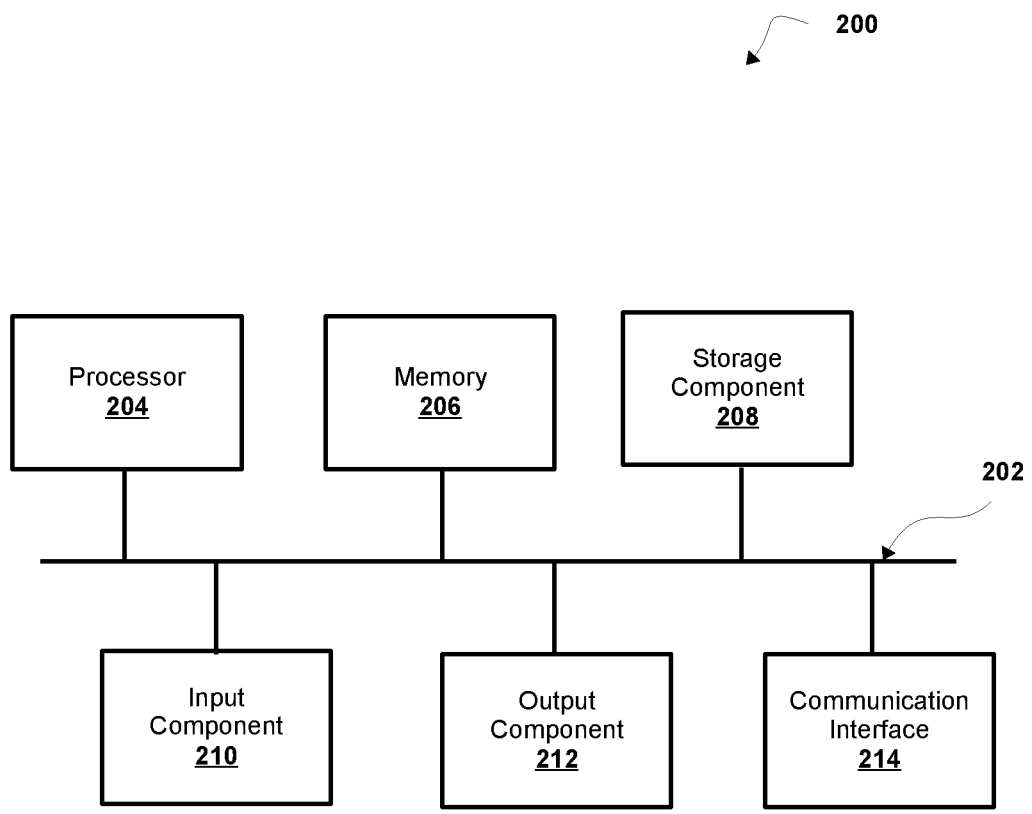
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of compatibility prediction system 102, one or more devices of image data system 106, and/or user device 108 (e.g., one or more devices of a system of user device 108, etc.). In some non-limiting embodiments or aspects, one or more devices of compatibility prediction system 102, one or more devices of image data system 106, and/or user device 108 (e.g., one or more devices of a system of user device 108, etc.) may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, non-limiting embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208, such as image data, text data, compatibility scores, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
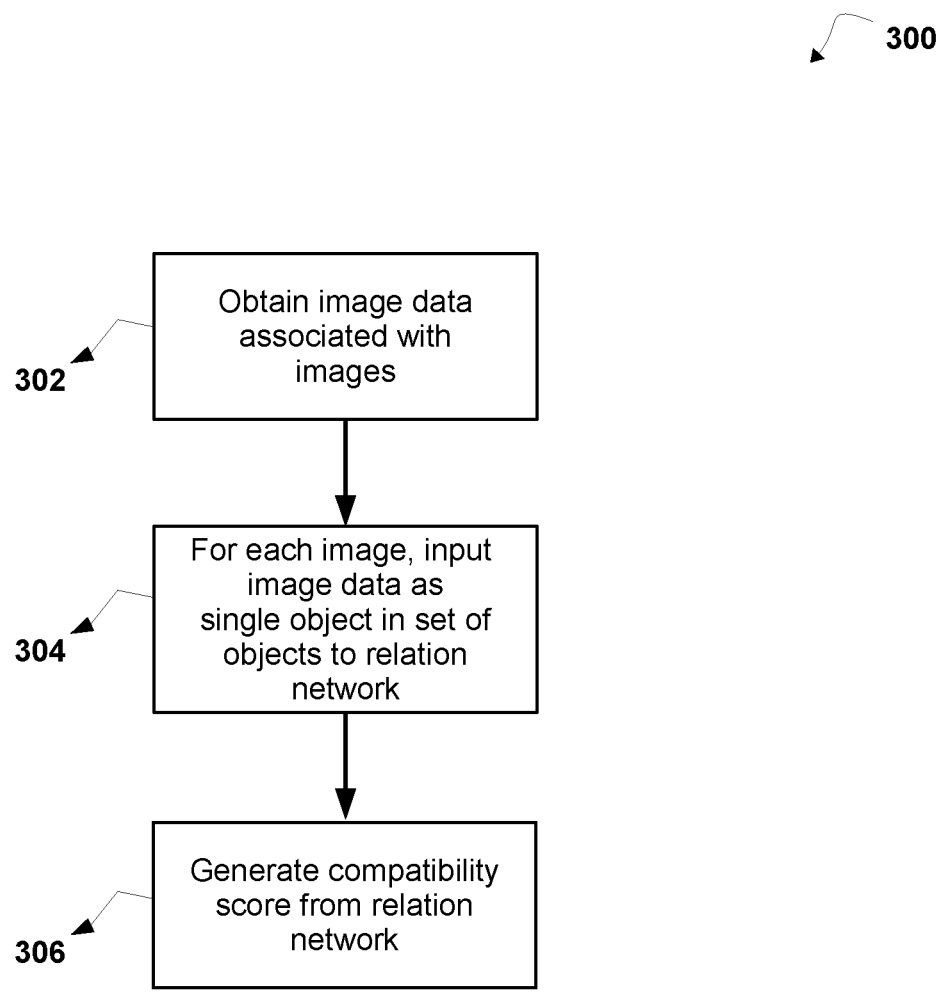
FIG. 3 is a flowchart of non-limiting embodiments or aspects of a process for determining compatibility between items in images.

Referring now to FIG. 3, FIG. 3 is a flowchart of non-limiting embodiments or aspects of a process 300 for determining compatibility between items in images. In some non-limiting embodiments or aspects, one or more of the steps of process 300 may be performed (e.g., completely, partially, etc.) by compatibility prediction system 102 (e.g., one or more devices of compatibility prediction system 102, etc.). In some non-limiting embodiments or aspects, one or more of the steps of process 300 may be performed (e.g., completely, partially, etc.) by another device or a group of devices separate from or including compatibility prediction system 102, such as image data system 106 (e.g., one or more devices of image data system 106), and/or user device 108 (e.g., one or more devices of a system of user device 108, etc.).

As shown in FIG. 3, at step 302, process 300 may include obtaining image data associated with a plurality of images. For example, compatibility prediction system 102 may obtain image data associated with a plurality of images. As an example, compatibility prediction system 102 may obtain image data associated with a plurality of images (e.g., a set of multiple images, etc.). In such an example, each image may be associated with a single item of a plurality of items, each image may include a plurality of elements of a matrix, and the plurality of elements of the matrix of each image may include the image data associated with that image.

In some non-limiting embodiments or aspects, a plurality of images (e.g., a set of multiple images, etc.) includes at least three images, the plurality of items includes at least three items, and each image of the at least three images is associated with a different single item of the plurality of items. In some non-limiting embodiments or aspects, the plurality of items includes at least one of the following: at least one clothing item, at least one furniture item, at least one landscaping item, at least one graphical user interface item, at least one architectural item, at least one artwork item, or any combination thereof.

In some non-limiting embodiments or aspects, a relation network model or artificial intelligence algorithm for learning compatibility as described herein may be trained on and/or use a source of data collected from online communities, such as Polyvore, Chictopia, Shoplook, and/or the like. On these websites, users may create sets of items in images, such as outfits including fashion items, and/or the like and/or view and/or rate millions of outfits created by others. Such rich image data may be used to train an artificial intelligence algorithm, such as a relation network model as described herein, to learn different concepts and automatically create compatible sets of images (e.g., to learn fashion concepts and automatically create compatible and/or stylish outfits including multiple fashion items, etc.). For example, images of items with clear backgrounds and metadata including description, price, popularity, and/or the like may be obtained from Polyvore.

Many factors, such as style, texture, material, color and/or the like may contribute to compatibility, and relations between these factors may be non-linear. For example, compatible outfits may have two or more non redundant items that have well-matching colors and share similar style. As an example, items of incompatible outfits may have inconsistent styles or colors and/or redundant items (e.g., two shirts, etc.). In some non-limiting embodiments or aspects, a relation network is modified to learn a non-linear space that can predict a compatibility of a plurality of items (e.g., a compatibility of a fashion outfit, etc.). For example, input to a relation network model may include a set of objects. As an example, a set of objects may be considered as a scene, and items in the scene may be considered as the objects in the scene. In some non-limiting embodiments or aspects, to ensure a quality of a dataset, sets of items (e.g., outfits, etc.) may be collected from users who are highly popular on Polyvore and have a number of followers that satisfies a threshold number of followers (e.g., at least 100,000 followers, etc.). For each item, compatibility prediction system 102 may obtain and/or store an image (e.g., a 150×150 pixel image, etc.), item description, price, popularity, and/or the like. In some non-limiting embodiments or aspects, compatibility prediction system 102 may clean the dataset by excluding items that are not of a same type (e.g., by excluding items that are not clothing items, such as furniture items, and/or the like, for outfits using the metadata associated with the items, etc.). Compatibility prediction system 102 may remove or omit any outfit that is left with only one item. For example, the collected sets of items or outfits may each include two or more items (e.g., an arbitrary number of items greater than two, etc.) In some non-limiting embodiments or aspects, compatibility prediction system 102 may use a first percentage of the collected sets of items or outfits for training a relation network model (e.g., 70%, etc.) and a second percentage of the collected sets of items or outfits for testing the trained relation network model (e.g., 15%, etc.).

A dataset for training and/or testing a relation network model may include compatible sets of items or outfits (e.g., a positive class, etc.) and incompatible sets of items or outfits (e.g., a negative class, etc.). For example, compatibility prediction system 102 may create a negative class by randomly picking items from different sets of items or outfits as described by Han, X.; Wu, Z.; Jiang, Y.-G.; and Davis, L. S. in the paper titled "Learning fashion compatibility with bidirectional LSTMs" in the ACM on Multimedia Conference (2017), the contents of which is hereby incorporated in its entirety by reference. Although these outfits are not guaranteed to be incompatible, such outfits may have a lower probability of compatibility compared to outfits that have been created by fashion experts on Polyvore and/or like data sources and, therefore, a relation network model may assign lower compatibility scores to these randomly composed outfits. In some non-limiting embodiments or aspects, compatibility prediction system 102 may create or generate an incompatible set of items or outfit for each positive set of items or outfit.

Accordingly, instead of considering rows of a CNN feature map, extracted from an entire scene, as objects, a relation network model according to non-limiting embodiments or aspects may consider (e.g., receive as input, process, etc.) images of items in a set of items (e.g., images of items in an outfit, etc.) as objects. A DenseNet may be used to transform the images of the items into feature vectors. Because compatibility may be a visual relation, compatibility need not be question dependent, and, therefore use of a long short term memory (LSTM) model for question embedding may be avoided.

As shown in FIG. 3, at step 304, process 300 may include inputting, for each image, image data as a single object in a set of objects to a relation network. For example, compatibility prediction system 102 may input, for each image, image data as a single object in a set of objects to a relation network. As an example, compatibility prediction system 102 may input, for each image, the image data associated with that image as a single object in a set of objects to a relation network.

Figure 4:
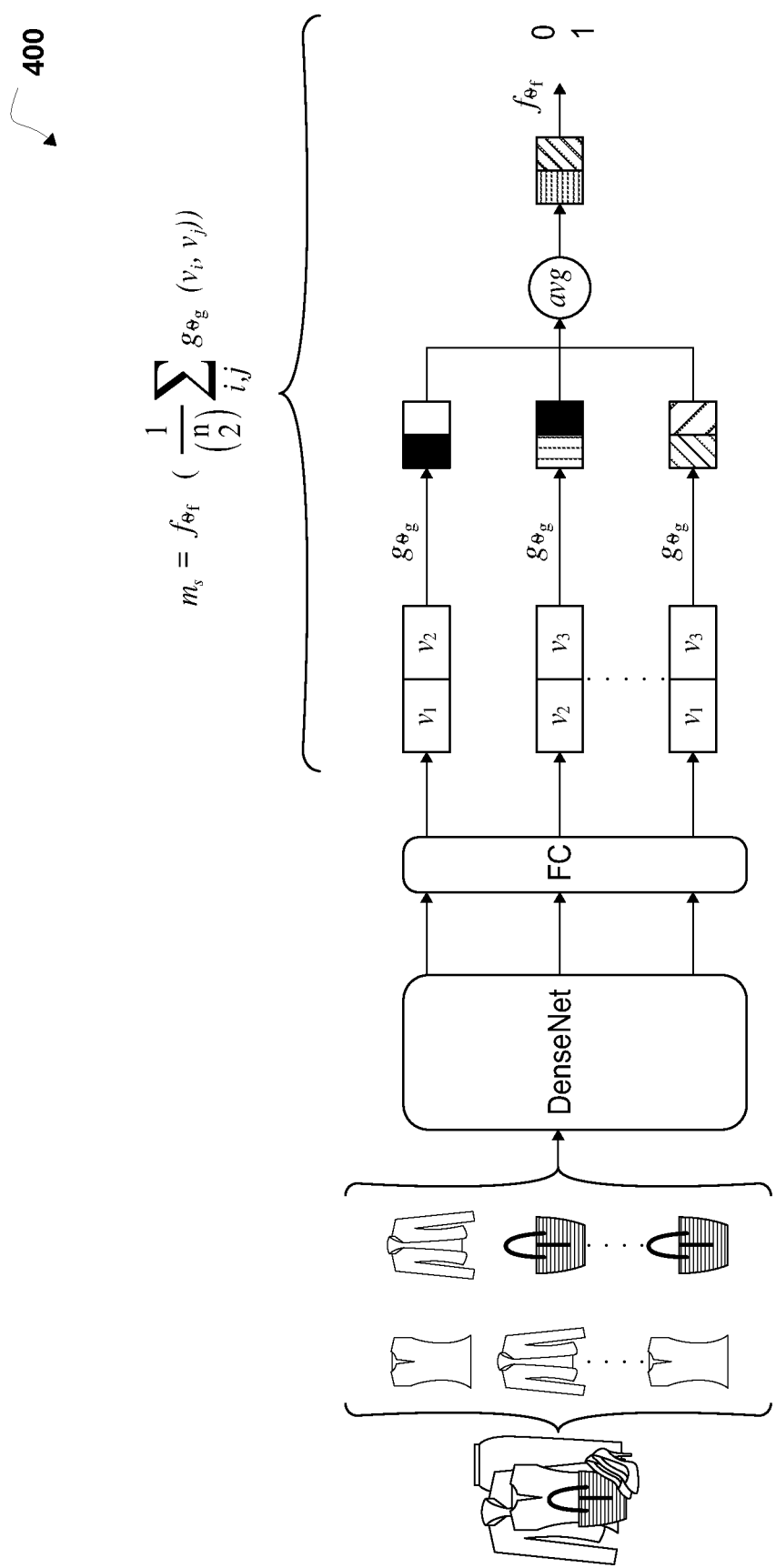
FIG. 4 is a diagram of non-limiting embodiments or aspects of a relation network model for determining compatibility between items in images.

Referring also to FIG. 4, FIG. 4 is a diagram of an implementation 400 of a relation network model according to non-limiting embodiments or aspects of the present disclosure. As shown in FIG. 4, a first part of a relation network model may learn a non-linear relation between each pair of items in a set of items or outfit, and a second part of the relation network model may combine each of the pairwise relations to learn a compatibility of the entire set of items or outfit. For example, given a set of items or outfit $S=[i_1, i_2, \ldots i_n]$, where i is images of the n items in the set S, a compatibility score $m_s$ of the set of items or outfit S may be determined by the relation network model based on the set S.

Figure 5:
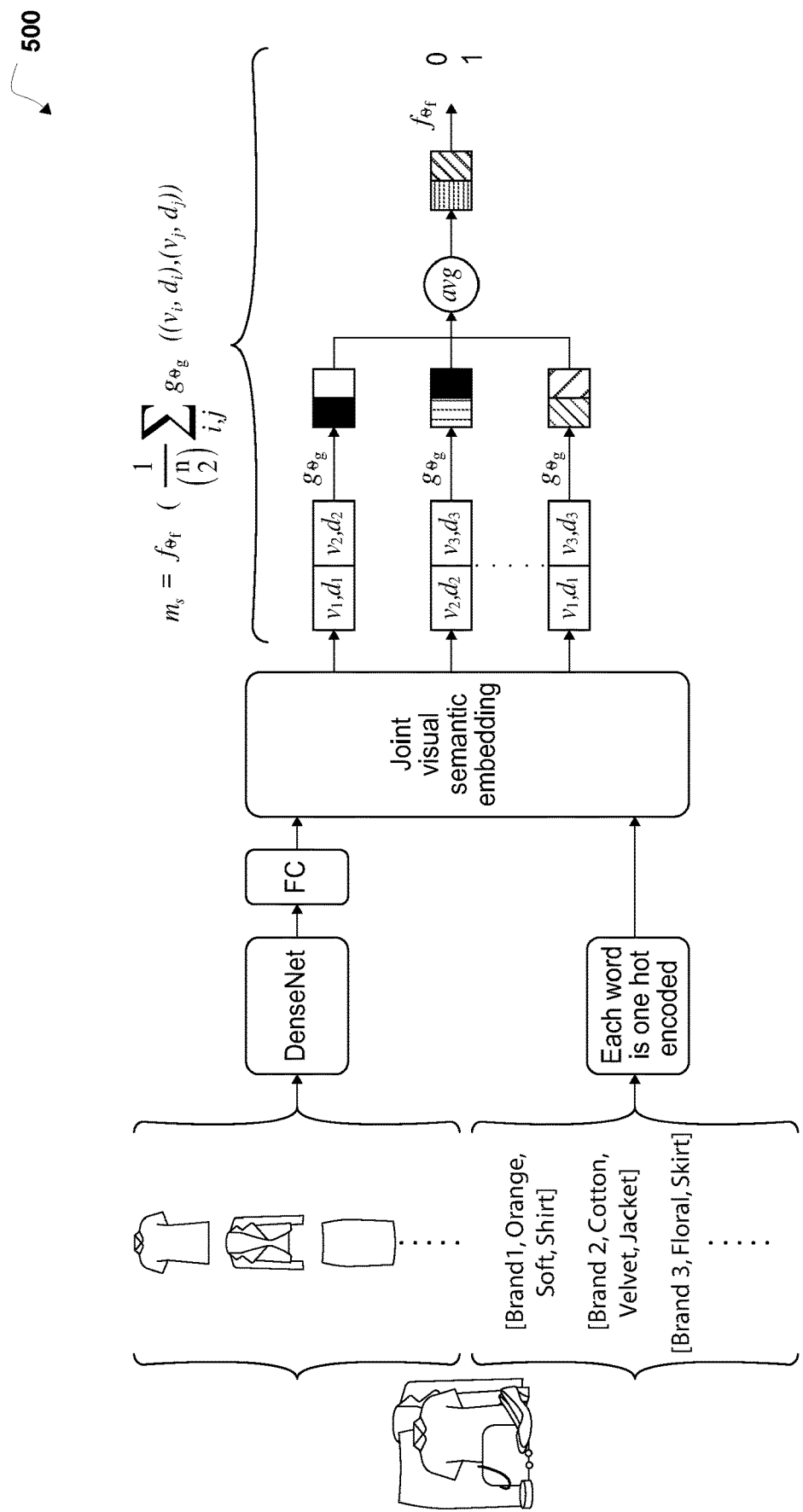
FIG. 5 is a diagram of non-limiting embodiments or aspects of a relation network model for determining compatibility between items in images.

In some non-limiting embodiments or aspects, text data may be combined with image data for training a relation network model to learn joint image and semantic embeddings with compatibility in an end-to-end fashion. For example, and referring also to FIG. 5, FIG. 5 is a diagram of an implementation 500 of a relation network model according to non-limiting embodiments or aspects of the present disclosure. As shown in FIG. 5, a relation network model may jointly learn visual embeddings from the image data (e.g., from given a set of items or outfit $S=[i_1, i_2, \ldots i_n]$, where i is images of the n items in the set S) and description embeddings of the n items from the text data associated with the images i with compatibility using a visual semantic embedding (VSE) process as described by Han, X.; Wu, Z.; Jiang, Y.-G.; and Davis, L. S. in the paper titled "Learning fashion compatibility with bidirectional LSTMs" in the ACM on Multimedia Conference (2017), the disclosure of which is hereby incorporated by reference in its entirety. For example, compatibility prediction system 102 may receive text data associated with one or more images of the plurality of images, wherein, for each of the one or more images associated with the text data, the text data includes a textual description of the single item associated with that image; for each of the one or more images associated with the text data, concatenate, the image data associated with that image with the text data associated with that image to produce concatenated data for that image; and for each of the one or more images associated with the text data, input the concatenated data for that image as the single object in the set of objects to the relation network. For example, compatibility prediction system 102 may, for each image, process the image data associated with that image with at least one convolutional neural network to produce a feature vector of the image; and for each of the one or more images associated with the text data, process the text data associated with that image with at least one multi-layer perceptron to produce an embedding of the textual description of the single item associated with that image. In such an example, the concatenated data for each of the one or more images associated with the text data may include the feature vector of that image and the embedding of the text description of the single item associated with that image.

In some non-limiting embodiments or aspects, and referring also to FIGS. 4 and 5, compatibility prediction system 102 may for each image, process the image data associated with that image with at least one convolutional neural network to produce a feature vector of the image, and for each image, input the feature vector of that image as the single object in the set of objects to the relation network. For example, compatibility prediction system 102 may use a DenseNet, as described by Huang, G.; Liu, Z.; Van Der Maaten, L.; and Weinberger, K. Q. in the paper titled "Densely connected convolutional networks" in the IEEE Conference on Computer Vision and Pattern Recognition (CVPR) (2017), the disclosure of which is hereby incorporated by reference in its entirety, which may be pre-trained on ImageNet, as described by Deng, J.; Dong, W.; Socher, R.; Li, L.-J.; Li, K.; and Fei Fei, L. in the paper titled "Imagenet: A large-scale hierarchical image database" in the IEEE Conference on Computer Vision and Pattern Recognition (CVPR) (2009), the disclosure of which is hereby incorporated by reference in its entirety, to convert each image to a feature vector (e.g., a feature vector of 94,080D, etc.). For example, DenseNets are CNN based architectures, which are somewhat similar to ResNets, but create more discriminative features, have fewer parameters, and achieve higher accuracy in image classification tasks.

In some non-limiting embodiments or aspects, and still referring to FIGS. 4 and 5, compatibility prediction system 102 may transform each feature vector into a smaller dimension vector (e.g., a 1000D vector, etc.) using a fully connected (FC) layer (e.g., a single FC layer, etc.), which downsizes the feature vector and learns a latent space from dimensions that correspond to attributes or styles (e.g., fashion attributes or styles, etc.) and contribute to compatibility. For example, $V_s=[v_1, v_2, \ldots, v_n]$ may include 1,000D feature vectors of the n item images in the set of items S. As an example, 94,080D features from DenseNet as image representations may be converted to 1,000D with one fully connected layer and thus $v_i \in R^{1000}$.

As shown in FIG. 3, at step 306, process 300 may include generating a compatibility score. For example, compatibility prediction system 102 may generate a compatibility score. As an example, compatibility prediction system 102 may generate a compatibility score for the plurality of items from the relation network based on the set of objects. In such an example, the compatibility score may include a prediction of whether the plurality of items is compatible.

In some non-limiting embodiments or aspects, and referring also to FIG. 4, given a set S of n items (e.g., a fashion outfit, etc.) a relation network model may be trained to predict a compatibility (e.g., generate a compatibility score $m_s$) of the set S of n items by utilizing visual compatibility relationships between the items in the set according to the following Equation (1):

$$m_s = f_{\theta_f}\left(\frac{1}{\binom{n}{2}}\sum_{i,j}g_{\theta_g}(v_i, v_j)\right) \quad (1)$$

where f and g are layers including multiple non-linear functions with parameters $\theta_f$ and $\theta_g$ and where $v_i$ and $v_j$ correspond to visual embeddings of items i and j.

In some non-limiting embodiments or aspects, and referring also to FIG. 5, given a set S of n items (e.g., a fashion outfit, etc.) a relation network model may be trained to predict a compatibility (e.g., generate a compatibility score $m_s$) of the set S of n items by utilizing visual compatibility relationships and descriptive compatibility relationships between the items in the set according to the following Equation (2):

$$m_s = \frac{1}{\binom{n}{2}} \sum_{i,j} d(v_i, v_j) \qquad (2)$$

where f and g are layers including multiple non-linear functions with parameters $\theta_f$ and $\theta_g$, where $v_i$ and $v_j$ correspond to visual embeddings of items i and j, and where $d_i$ and $d_j$ correspond to description embeddings of the items i and j.

In some non-limiting embodiments or aspects, generating the compatibility score for the plurality of items from the relation network based on the set of objects further includes: for each pair of objects in the set of objects, processing that pair of objects with at least one multi-layer perceptron to produce a relation output; determining an average of the relation outputs of the each pair of objects in the set of objects to produce a single averaged output; and processing the single averaged output with at least one other multi-layer perceptron to produce the compatibility score for the plurality of items. For example, $f_{\theta_f}$ and $g_{\theta_g}$ may include multi-layer perceptrons (MLPs) that learn the parameters $\theta = [\theta_f, \theta_g]$ such that compatibility prediction system 102 can use the MLPs to predict the compatibility between items. As an example, g may include four layers (e.g., with sizes 512, 512, 256, 256, etc.) and f may include three layers (e.g., with sizes 128, 128, 32, etc.). In such an example, $\Theta_g \in R^{2000*256}$ and $\Theta_f \in R^{256*32}$. For example, an output of $g_\theta$ may include the "relation" between items and, thus, $g_\theta$ may learn a relation between visual appears of $v_i$ and $v_j$.

In some non-limiting embodiments or aspects, and still referring to FIGS. 4 and 5, compatibility prediction system 102 may use a softmax layer after the layer f for classification. Batch normalization and rectified linear unit (ReLU) activation may be used for each of the layers f and g. In some non-limiting embodiments or aspects, compatibility prediction system 102 may set a dropout rate to a predetermined rate (e.g., 0.35, etc.) for each of the layers of the relation network except the layer f.

In some non-limiting embodiments or aspects, compatibility prediction system 102 may train a relation network with back propagation using a cross-entropy loss function according to the following Equation (3):

$$L = -\sum_{1}^{s} (y \log(p) + (1-y)\log(1-p)) \qquad (3)$$

where S is a number of classes (e.g., compatible, not compatible, etc.), y is a binary indicator (e.g., 0 or 1) if a class label is a correct classification, and where p is a predicted probability that an observation is of the class. For example, compatibility prediction system 102 may adjust a weighting of the at least one convolutional neural network, a weighting of the at least one multi-layer perceptron, and a weighting of the relation network based on back propagation using a loss function applied to the compatibility score for the plurality of items.

In some non-limiting embodiments or aspects, compatibility prediction system 102 may set a learning rate of the relation network (e.g., 0.001) and a batch size (e.g., 64, etc.). For example, each batch may include a number of sets of items equal to the batch size. In some non-limiting embodiments or aspects, compatibility prediction system 102 may train the relation network until a validation loss stabilizes.

In some non-limiting embodiments or aspects, for each pair of objects in the set of objects, processing of that pair of objects with the at least one multi-layer perceptron is order invariant. For example, a relation network may be order invariant. As an example, an order in which items or objects are passed to the relation network may not matter or affect the output thereof. Although to detect the compatibility of a plurality of items, the relation between all of the items may be considered, using a relation network provides flexibility to considering only some of the item pairs, or to put greater weights on some of the item pairs. For example, if an item (e.g., a handbag, etc.) is a center piece of an outfit and one likes to compose an outfit around this item or that magnifies this item, compatibility prediction system 102 may place greater weights on the relations that involve this item.

In some non-limiting embodiments or aspects, compatibility prediction system 102 may apply a relation network model according to non-limiting embodiments or aspects to sets of items with an arbitrary number of items. A time complexity of calculating a compatibility of a set of items with n items is $O(\binom{n}{2})$ with respect to the number n of the items in the set of items. However, because sets of items may typically have a limited number of items (e.g., typically less than 12 clothing items in a fashion outfit, etc.), the time complexity may remain linear ($O(<66n)$). For example, an order of objects in each pair may not impact an accuracy of a relation network model according to non-limiting embodiments or aspects and, thus, a time complexity may be $O(\binom{n}{2})$ and not $O(n^2)$.

In some non-limiting embodiments or aspects, for each pair of objects in the set of objects, processing of that pair of objects with the at least one multi-layer perceptron is independent of question embedding. For example, a compatibility framework based on relation networks may eliminate a need for passing item category labels as input to the network, because a relation network itself may be able to implicitly learn such information.

Non-limiting embodiments or aspects of the present disclosure provide improved systems, methods, and computer program products for determining compatibility between items in terms of AUC score in a compatibility prediction test and accuracy in a Fill In The Blank (FITB) test as compared to existing recommendation systems or compatibility prediction systems. For example, non-limiting embodiments or aspects of the present disclosure may not use contextual data because they may inherently learn a variety of relations between items including their categories, which indicates that visual information can be sufficient for learning compatibility, and which may be particularly useful when semantic information is not available or is very noisy.

As an example, non-limiting embodiments or aspects of the present disclosure perform better than the existing comparing pair-wise methods, which indicates that pair-wise methods fail to work well on learning the compatibility of outfits with more than two items. In such an example, pair-wise methods linear combination of pair-wise compatibility scores (e.g., averaging all the pair-wise scores) fails to capture the compatibility of an entire set of items or outfit. In contrast, non-limiting embodiments or aspects of the present disclosure may start by learning the relations between item pairs, but combine the pair-wise relations and pass them through multiple nonlinear layers to learn more powerful feature representations from an entire set of items or outfit, which may determine the compatibility of an outfit more accurately than simply averaging all the pair-wise compatibility scores.

As another example, non-limiting embodiments or aspects of the present disclosure may not feed any category labels or attributes (e.g., men, women, shirt, shoes, etc.) to a relation network model thereof to learn, for example, that a men's shirt may be incompatible with a woman's skirt and/or an outfit with redundant items is incompatible.

In some non-limiting embodiments or aspects, utilizing joint visual-semantic embedding in a relation network model may improve an accuracy and performance gain of the model for a FITB test. In such an example, adding semantic information may improve ranking among the compatible candidates.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for determining compatibility between items in images, comprising:
    obtaining, with at least one processor, image data associated with a plurality of images, wherein each image is associated with a single item of a plurality of items, wherein each image includes a plurality of elements of a matrix, and wherein the plurality of elements of the matrix of each image comprises the image data associated with that image;
    for each image, inputting, with at least one processor, the image data associated with that image as a single object in a set of objects to a relation network; and
    generating, with at least one processor, a compatibility score for the plurality of items from the relation network based on the set of objects, wherein the compatibility score includes a prediction of whether the plurality of items is compatible, and
    wherein generating the compatibility score for the plurality of items from the relation network based on the set of objects further comprises:
        for each pair of objects in the set of objects, processing, with at least one processor, that pair of objects with at least one multi-layer perceptron to produce a relation output;
        determining, with at least one processor, an average of the relation outputs of the each pair of objects in the set of objects to produce a single averaged output; and
        processing, with at least one processor, the single averaged output with at least one other multi-layer perceptron to produce the compatibility score for the plurality of items.

2. The computer-implemented method of claim 1, further comprising:
    for each image, processing, with at least one processor, the image data associated with that image with at least one convolutional neural network to produce a feature vector of the image; and
    for each image, inputting, with at least one processor, the feature vector of that image as the image data associated with that image as the single object in the set of objects to the relation network.

3. The computer-implemented method of claim 1, wherein, for each pair of objects in the set of objects, processing of that pair of objects with the at least one multi-layer perceptron is order invariant.

4. The computer-implemented method of claim 1, wherein, for each pair of objects in the set of objects, processing of that pair of objects with the at least one multi-layer perceptron is independent of question embedding.

5. The computer-implemented method of claim 1, further comprising:
    obtaining, with at least one processor, text data associated with one or more images of the plurality of images, wherein, for each of the one or more images associated with the text data, the text data includes a textual description of the single item associated with that image;
    for each of the one or more images associated with the text data, concatenating, with at least one processor, the image data associated with that image with the text data associated with that image to produce concatenated data for that image; and
    for each of the one or more images associated with the text data, inputting, with at least one processor, the concatenated data for that image as the image data associated with that image as the single object in the set of objects to the relation network.

6. The computer-implemented method of claim 5, further comprising:
    for each image, processing, with at least one processor, the image data associated with that image with at least one convolutional neural network to produce a feature vector of the image; and
    for each of the one or more images associated with the text data, processing, with at least one processor, the text data associated with that image with at least one multi-layer perceptron to produce an embedding of the textual description of the single item associated with that image,
    wherein the concatenated data for each of the one or more images associated with the text data includes the feature vector of that image and the embedding of the text description of the single item associated with that image.

7. The computer-implemented method of claim 6, further comprising:
    adjusting, with at least one processor, a weighting of the at least one convolutional neural network, a weighting of the at least one multi-layer perceptron, and a weighting of the relation network based on back propagation using a loss function applied to the compatibility score for the plurality of items.

8. The computer-implemented method of claim 1, wherein the plurality of images includes at least three images, wherein the plurality of items includes at least three items, and wherein each image of the at least three images is associated with a different single item of the plurality of items.

9. The computer-implemented method of claim 1, wherein the plurality of items includes at least one of the following: at least one clothing item, at least one furniture item, at least one landscaping item, at least one graphical user interface item, at least one architectural item, at least one artwork item, or any combination thereof.

10. A system for determining compatibility between items in images, comprising:
at least one processor programmed and/or configured to:
obtain image data associated with a plurality of images, wherein each image is associated with a single item of a plurality of items, wherein each image includes a plurality of elements of a matrix, and wherein the plurality of elements of the matrix of each image comprises the image data associated with that image;
input, for each image, the image data associated with that image as a single object in a set of objects to a relation network; and
generate a compatibility score for the plurality of items from the relation network based on the set of objects, wherein the compatibility score includes a prediction of whether the plurality of items is compatible,
wherein the at least one processor is further programmed and/or configured to generate the compatibility score for the plurality of items from the relation network based on the set of objects by:
for each pair of objects in the set of objects, processing that pair of objects with at least one multi-layer perceptron to produce a relation output;
determining an average of the relation outputs of the each pair of objects in the set of objects to produce a single averaged output; and
processing the single averaged output with at least one other multi-layer perceptron to produce the compatibility score for the plurality of items.

11. The system of claim 10, wherein the at least one processor is further programmed and/or configured to:
process, for each image, the image data associated with that image with at least one convolutional neural network to produce a feature vector of the image; and
input, for each image, the feature vector of that image as the image data associated with that image as the single object in the set of objects to the relation network.

12. The system of claim 10, wherein, for each pair of objects in the set of objects, processing of that pair of objects with the at least one multi-layer perceptron is order invariant.

13. The system of claim 10, wherein, for each pair of objects in the set of objects, processing of that pair of objects with the at least one multi-layer perceptron is independent of question embedding.

14. The system of claim 10, wherein the at least one processor is further programmed or configured to:
obtain text data associated with one or more images of the plurality of images, wherein, for each of the one or more images associated with the text data, the text data includes a textual description of the single item associated with that image;
concatenate, for each of the one or more images associated with the text data, the image data associated with that image with the text data associated with that image to produce concatenated data for that image; and
input, for each of the one or more images associated with the text data, the concatenated data for that image as the image data associated with that image as the single object in the set of objects to the relation network.

15. The system of claim 14, wherein the at least one processor is further programmed or configured to:
process, for each image, the image data associated with that image with at least one convolutional neural network to produce a feature vector of the image;
process, for each of the one or more images associated with the text data, the text data associated with that image with the at least one multi-layer perceptron to produce an embedding of the textual description of the single item associated with that image; and
adjust a weighting of the at least one convolutional neural network, a weighting of the at least one multi-layer perceptron, and a weighting of the relation network based on back propagation using a loss function applied to the compatibility score for the plurality of items,
wherein the concatenated data for each of the one or more images associated with the text data includes the feature vector of that image and the embedding of the text description of the single item associated with that image.

16. The system of claim 10, wherein the plurality of images includes at least three images, wherein the plurality of items includes at least three items, and wherein each image of the at least three images is associated with a different single item of the plurality of items.

17. The system of claim 10, wherein the plurality of items includes at least one of the following: at least one clothing item, at least one furniture item, at least one landscaping item, at least one graphical user interface item, at least one architectural item, at least one artwork item, or any combination thereof.

18. A computer program product including at least one non-transitory computer-readable medium including one or more instructions that, when executed by at least one processor, cause the at least one processor to:
obtain image data associated with a plurality of images, wherein each image is associated with a single item of a plurality of items, wherein each image includes a plurality of elements of a matrix, and wherein the plurality of elements of the matrix of each image comprises the image data associated with that image;
input, for each image, the image data associated with that image as a single object in a set of objects to a relation network; and
generate a compatibility score for the plurality of items from the relation network based on the set of objects, wherein the compatibility score includes a prediction of whether the plurality of items is compatible,
wherein the instructions, when executed by the at least one processor, further cause the at least one processor to generate the compatibility score for the plurality of items from the relation network based on the set of objects by:
for each pair of objects in the set of objects, processing that pair of objects with at least one multi-layer perceptron to produce a relation output;
determining an average of the relation outputs of the each pair of objects in the set of objects to produce a single averaged output; and
processing the single averaged output with at least one other multi-layer perceptron to produce the compatibility score for the plurality of items.

* * * * *